(12) United States Patent
Matsui

(10) Patent No.: US 11,087,576 B2
(45) Date of Patent: Aug. 10, 2021

(54) INFORMATION OUTPUT DEVICE AND SYSTEM AND NON-TRANSITORY COMPUTER READABLE MEDIUM

(71) Applicant: FUJIFILM BUSINESS INNOVATION CORP., Tokyo (JP)

(72) Inventor: Kenki Matsui, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/542,360

(22) Filed: Aug. 16, 2019

(65) Prior Publication Data
US 2020/0302714 A1  Sep. 24, 2020

(30) Foreign Application Priority Data

Mar. 19, 2019  (JP) .............................. JP2019-050906

(51) Int. Cl.
*G07C 9/29* (2020.01)
*H04N 1/44* (2006.01)
*G07C 9/28* (2020.01)
*G07C 9/24* (2020.01)

(52) U.S. Cl.
CPC .............. *G07C 9/29* (2020.01); *G07C 9/247* (2020.01); *G07C 9/28* (2020.01); *H04N 1/4426* (2013.01)

(58) Field of Classification Search
CPC . G07C 9/29; G07C 9/247; G07C 9/28; H04N 1/4426
See application file for complete search history.

(56) References Cited

U.S. PATENT DOCUMENTS

| 8,508,760 | B2 | 8/2013 | Sahashi | |
|---|---|---|---|---|
| 2006/0026434 | A1* | 2/2006 | Yoshida | H04N 1/00244 713/182 |
| 2008/0040817 | A1* | 2/2008 | Kawai | G07C 9/38 726/34 |
| 2008/0181648 | A1* | 7/2008 | Makishima | G03G 15/5083 399/75 |
| 2017/0366708 | A1* | 12/2017 | Yamaguchi | H04N 1/32122 |

FOREIGN PATENT DOCUMENTS

| JP | 2009-55580 A | 3/2009 |
|---|---|---|
| JP | 2018-30295 A | 3/2018 |

* cited by examiner

*Primary Examiner* — Nabil H Syed
(74) *Attorney, Agent, or Firm* — Oliff PLC

(57) ABSTRACT

An information output device includes first and second acquirers and a setter. The first acquirer acquires attribute information concerning an attribute of a user having accessed an area where access control is performed. The second acquirer acquires a setting condition for setting an authenticated output function. The authenticated output function is a function for demanding authentication for outputting information. The setter enables or disables the authenticated output function, based on the attribute information acquired by the first acquirer and the setting condition acquired by the second acquirer.

19 Claims, 7 Drawing Sheets

| USER ATTRIBUTE | SETTING |
|---|---|
| OUTSIDER | ENABLE |
| CONTRACTOR | ENABLE |
| IN-HOUSE EMPLOYEE (SALES) | ENABLE |
| IN-HOUSE EMPLOYEE (DEVELOPMENT) | DISABLE |
| ⋮ | ⋮ |

FIG. 3

| USER ATTRIBUTE | SETTING |
|---|---|
| OUTSIDER | ENABLE |
| CONTRACTOR | ENABLE |
| IN-HOUSE EMPLOYEE (SALES) | ENABLE |
| IN-HOUSE EMPLOYEE (DEVELOPMENT) | DISABLE |
| ⋮ | ⋮ |

FIG. 4

| USER NAME | ATTRIBUTE |
|---|---|
| A | IN-HOUSE EMPLOYEE (DEVELOPMENT) |
| B | IN-HOUSE EMPLOYEE (SALES) |
| ⋮ | ⋮ |

INFORMATION OUTPUT DEVICE AND SYSTEM AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-050906 filed Mar. 19, 2019.

BACKGROUND

(i) Technical Field

The present disclosure relates to an information output device and system and a non-transitory computer readable medium.

(ii) Related Art

Hitherto, a multifunction device including plural communication units having different communication coverages that communicate with a mobile terminal device in a non-contact manner is known (see Japanese Unexamined Patent Application Publication No. 2009-55580, for example).

This multifunction device is operated as follows. A Bluetooth (registered trademark) communication unit establishes communication with a mobile terminal device and receives data. When a certain Bluetooth communication unit receives data from the mobile terminal device, a judging unit identifies which Bluetooth communication unit has received the data among the plural Bluetooth communication units. Then, the judging unit judges based on the identified Bluetooth communication unit whether the mobile terminal device is located within the communication coverage of a W-USB communication unit. If the mobile terminal device is located within the communication coverage of the W-USB communication unit, a permission unit permits outputting of the received data.

A wireless communication system which includes a terminal and a device that can wirelessly communicate with each other and which adjusts the status of the device in accordance with the status of the terminal is known (see Japanese Unexamined Patent Application Publication No. 2018-30295, for example).

In this wireless communication system, the device regularly sends a broadcast signal by near field communication, and, upon receiving the broadcast signal, an application installed in the terminal establishes two-way communication between the terminal and the device in accordance with the broadcast signal. Then, the device adjusts its status based on information received from the terminal by two-way communication.

SUMMARY

Aspects of non-limiting embodiments of the present disclosure relate to an information output device that is able to enhance the security for outputting information and also to reduce time and effort for setting an authenticated output function, and also relate to an information output system and a non-transitory computer readable medium.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information output device including first and second acquirers and a setter. The first acquirer acquires attribute information concerning an attribute of a user having accessed an area where access control is performed. The second acquirer acquires a setting condition for setting an authenticated output function. The authenticated output function is a function for demanding authentication for outputting information. The setter enables or disables the authenticated output function, based on the attribute information acquired by the first acquirer and the setting condition acquired by the second acquirer.

BRIEF DESCRIPTION OF THE DRAWINGS

Exemplary embodiments of the present disclosure will be described in detail based on the following figures, wherein:

FIG. 3 schematically illustrates an example of the configuration of an attribute information database according to the first exemplary embodiment;

FIG. 4 schematically illustrates an example of the configuration of a user information database according to the first exemplary embodiment;

DETAILED DESCRIPTION

First Exemplary Embodiment

Figure 1:
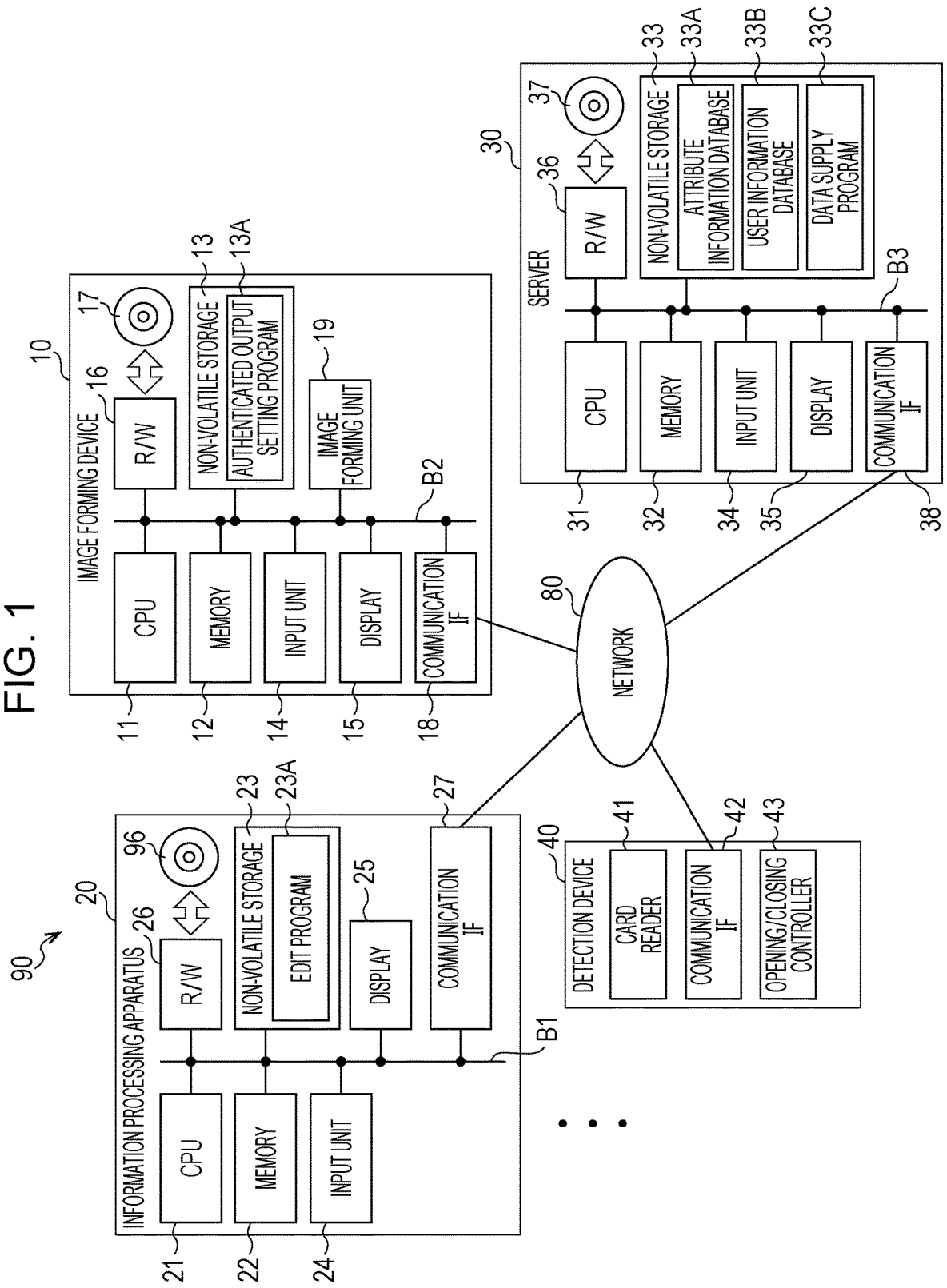
FIG. 1 is a block diagram illustrating an example of the hardware configuration of an image forming system according to a first exemplary embodiment.

Exemplary embodiments of the disclosure will be described below in detail with reference to the accompanying drawings. In a first exemplary embodiment, the disclosure is applied to an image forming system 90 including an image forming device 10, plural information processing apparatuses 20 that are individually used by corresponding users, a server 30 constituted by a server computer, and a detection device 40.

Figure 2:
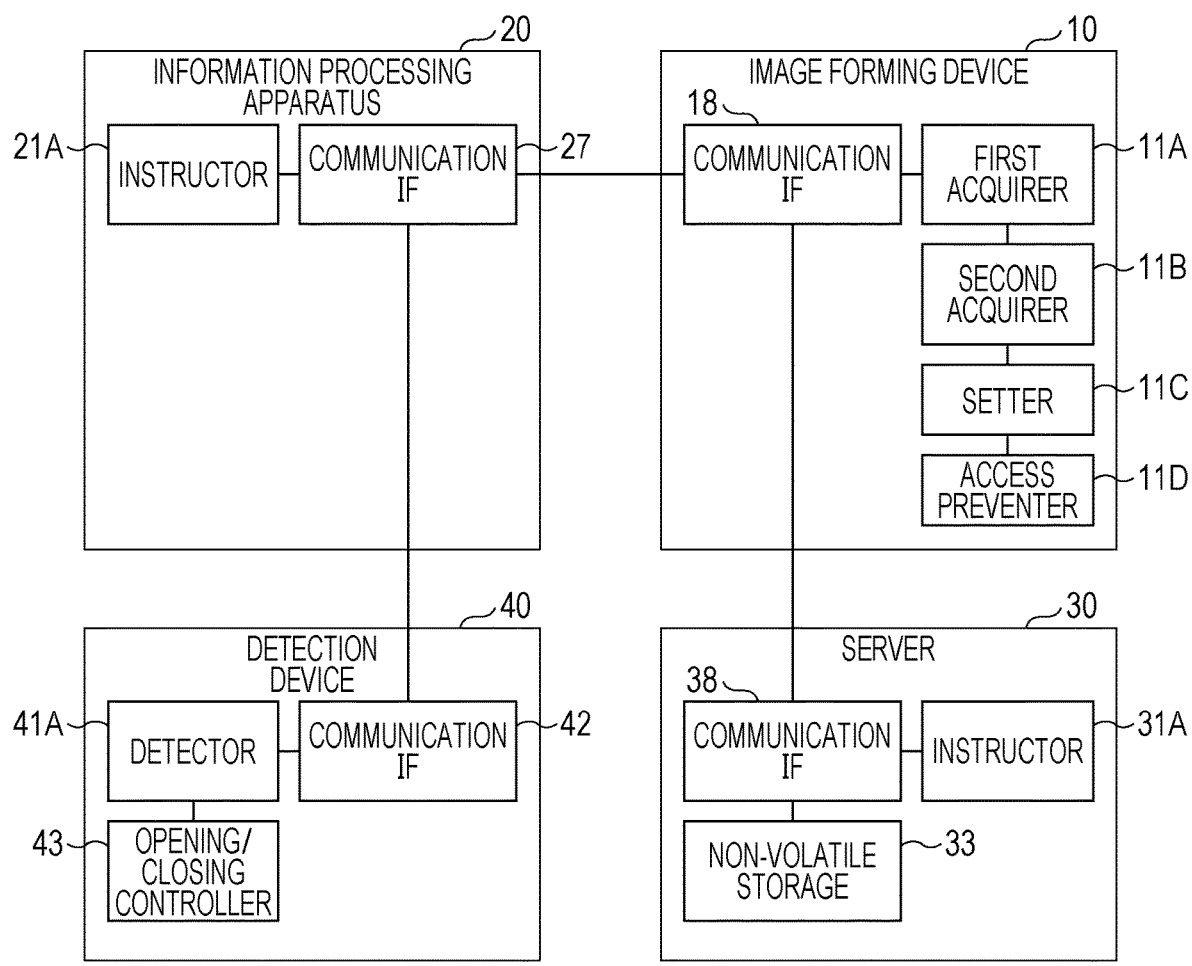
FIG. 2 is a block diagram illustrating an example of the functional configuration of the image forming system according to the first exemplary embodiment.

The configuration of the image forming system 90 according to the first exemplary embodiment will first be discussed with reference to FIGS. 1 and 2. As shown in FIG. 1, in the image forming system 90, the image forming device 10, the plural information processing apparatuses 20, the server 30, and the detection device 40 are connected to a network 80 so that they can access each other.

Examples of the image forming device 10 are a multifunction device and a printer. Examples of the information processing apparatuses 20 are a personal computer (PC), a smartphone, a tablet, and a personal digital assistant (PDA), which are mobile terminals.

(Information Processing Apparatus)

The information processing apparatuses 20 in the first exemplary embodiment are individually used by corresponding plural users of the image forming system 90. The information processing apparatuses 20 instruct the image forming device 10 to form an image.

The information processing apparatuses 20 are individually assigned to the users. This allows the image forming device 10 to recognize which information processing apparatus 20 has provided an instruction to form an image, based on the network address or the computer name of this information processing apparatus 20, and to identify the user of the information processing apparatus 20.

An information processing apparatus 20 includes a central processing unit (CPU) 21, a memory 22, which serves as a temporary storage, a non-volatile storage 23, an input unit 24 including a touchscreen or a keyboard and a mouse, a display 25, such as a liquid crystal display (LCD), a medium reader/writer (R/W) 26, and a communication interface (IF) 27. The other information processing apparatuses 20 are configured in the same manner.

The CPU 21, the memory 22, the non-volatile storage 23, the input unit 24, the display 25, the medium R/W 26, and the communication IF 27 are connected to one another via a bus B1. The medium R/W 26 reads information from a recording medium 96 and writes information into the recording medium 96.

The non-volatile storage 23 is implemented by a hard disk drive (HDD), a solid state drive (SSD), or a flash memory. In the non-volatile storage 23 serving as a storage medium, an edit program 23A for providing an instruction to edit or print a document is stored.

The edit program 23A is stored in the non-volatile storage 23 as a result of the recording medium 96 storing the edit program 23A being set in the medium R/W 26 and the medium R/W 26 reading the edit program 23A from the recording medium 96. The CPU 21 reads the edit program 23A from the non-volatile storage 23, loads it to the memory 22, and sequentially executes processes described in the edit program 23A. The edit program 23A may alternatively be downloaded via the network 80.

As a result of the CPU 21 being operated in accordance with the edit program 23A, a document can be edited and an edited document can be printed by the image forming device 10.

(Image Forming Device)

The image forming device 10 is a device that outputs information to the outside. The image forming device 10 has an output function of forming an image on a medium based on a print instruction or print data received from the information processing apparatus 20 and outputting the medium, and displaying information received from the information processing apparatus 20 on a display 15, for example. The image forming device 10 also has an authenticated output function which demands authentication, such as inputting an ID on a panel or presenting an ID card, when information is output to the outside. Examples of information received from the information processing apparatus 20 are employee schedule information and account settlement information.

The image forming device 10 is installed in an area where access control is performed. An example of such an area is a room in which access control is performed.

An example of such a room is an office shared among different companies (shared office). Members of different companies are in and out of this room. Users allowed to enter this room are determined in advance.

The area where access control is performed is not restricted to indoor locations and may be outdoor locations. In the first exemplary embodiment, however, an indoor room is an example of the area where access control is performed.

The image forming device 10 may be installed within a room of a company where its employees and contractors are in and out and where access control is performed.

The image forming device 10 includes a CPU 11, a memory 12, which is a temporarily storage, a non-volatile storage 13, an input unit 14 including a keyboard and a mouse, and a display 15, such as an LCD. The image forming device 10 also includes a medium R/W 16, an image forming unit 19 which forms an image on a medium and outputs it, and a communication IF 18.

The CPU 11, the memory 12, the non-volatile storage 13, the input unit 14, the display 15, the medium R/W 16, the image forming unit 19, and the communication IF 18 are connected to one another via a bus B2. The medium R/W 16 reads information from a recording medium 17 and writes information into the recording medium 17.

The non-volatile storage 13 is implemented by an HDD, an SSD, or a flash memory. In the non-volatile storage 13 serving as a storage medium, an authenticated output setting program 13A is stored.

The authenticated output setting program 13A is stored in the non-volatile storage 13 as a result of the recording medium 17 storing the authenticated output setting program 13A being set in the medium R/W 16 and the medium R/W 16 reading the authenticated output setting program 13A from the recording medium 17. The CPU 11 reads the authenticated output setting program 13A from the non-volatile storage 13, loads it to the memory 12, and sequentially executes processes described in the authenticated output setting program 13A. The authenticated output setting program 13A may alternatively be downloaded via the network 80.

(Server)

The server 30 is a device that centrally manages data to be used in the image forming device 10, for example.

The server 30 includes a CPU 31, a memory 32, which is a temporarily storage, a non-volatile storage 33, an input unit 34 including a keyboard and a mouse, a display 35, such as an LCD, a medium R/W 36, and a communication IF 38.

The CPU 31, the memory 32, the non-volatile storage 33, the input unit 34, the display 35, the medium R/W 36, and the communication IF 38 are connected to one another via a bus B3. The medium R/W 36 reads information from a recording medium 37 and writes information into the recording medium 37.

The non-volatile storage 33 is implemented by an HDD, an SSD, or a flash memory. In the non-volatile storage 33 serving as a storage medium, an attribute information database 33A, a user information database 33B, and a data supply program 33C are stored. In the attribute information database 33A, the attributes of users authorized to access the room are stored. In the user information database 33B, attribute information concerning the attributes of users having entered the room is stored.

The data supply program 33C is stored in the non-volatile storage 33 as a result of the recording medium 37 storing the data supply program 33C being set in the medium R/W 36 and the medium R/W 36 reading the data supply program 33C from the recording medium 37. The data supply program 33C may be downloaded or uploaded via the network 80.

The CPU 31 reads the data supply program 33C from the non-volatile storage 33, loads it to the memory 32, and sequentially executes processes described in the data supply program 33C.

The CPU 31 is operated in accordance with the data supply program 33C so as to send various items of data stored in the attribute information database 33A and the user information database 33B to the image forming device 10 in response to a request.

(Detection Device)

The detection device 40 is a device that centrally manages access to the room. The detection device 40 is installed inside the room and also outside the room at the entrance.

The detection device 40 includes a card reader 41, a communication IF 42, and an opening/closing controller 43. The card reader 41, the communication IF 42, and the opening/closing controller 43 are connected to one another.

The card reader 41 is a device that reads an ID number stored in an ID card. The opening/closing controller 43 controls the opening and closing of the entrance door of the room.

An ID card is provided to a user authorized to access the room. When entering the room, the user holds this ID card over the card reader 41 of the detection device 40 installed outdoors, and the card reader 41 reads the ID number stored in the ID card. If the read ID number matches a registered ID, the opening/closing controller 43 opens the door to let the user in. The read ID number is also sent to the server 30 via the communication IF 42.

When leaving the room, the user holds this ID card over the card reader 41 of the detection device 40 installed indoors, and the card reader 41 reads the ID number stored in the ID card. If the read ID number matches a registered ID, the opening/closing controller 43 opens the door to let the user out. The read ID number is also sent to the server 30 via the communication IF 42.

In this manner, users entering the room and those leaving the room are sequentially detected, thereby making it possible to monitor users in the room.

The functional configurations of the image forming device 10, the information processing apparatus 20, the server 30, and the detection device 40 according to the first exemplary embodiment will be described below with reference to FIG. 2.

[Image Forming Device]

The image forming device 10 includes first and second acquirers 11A and 11B, a setter 11C, and an access preventer 11D.

The CPU 11 of the image forming device 10 executes the authenticated output setting program 13A so as to function as the first and second acquirers 11A and 11B, the setter 11C, and the access preventer 11D.

(First Acquirer)

In the first exemplary embodiment, the first acquirer 11A acquires attribute information concerning the attributes of users having entered the room where access control is performed. The acquired attribute information indicates the attributes of users in the room.

The first acquirer 11A may acquire attribute information concerning users having entered the room, based on the detection results obtained by a detector 41A of the detection device 40. The detector 41A detects user access to the room. In the first exemplary embodiment, the user information database 33B is used for acquiring the attribute information.

The first acquirer 11A may alternatively acquire attribute information concerning users having entered the room by using schedule information indicating a schedule of access to the room.

An example of the schedule information is schedule data indicating times at which individual users will enter and leave the room. The schedule data may be stored in the non-volatile storage 33 of the server 30. The image forming device 10 receives the schedule data from the server 30 via the network 80, thereby obtaining attribute information concerning users having entered the room according to the time.

(Second Acquirer)

The second acquirer 11B acquires a setting condition for setting the authenticated output function which demands authentication for outputting information, such as for outputting a medium on which an image is formed by the image forming unit 19 or displaying information. Outputting a medium with an image includes two cases where an image is formed in advance and then output and where an image is formed when it is output.

An example of the setting condition obtained by the second acquirer 11B is a condition for enabling the authenticated output function to allow a user to output a medium with an image or to display information. Another example of the setting condition is a condition for disabling the authenticated output function to prevent a user from outputting a medium with an image or displaying information.

(Setter)

The setter 11C enables or disables the authenticated output function, based on the attribute information obtained by the first acquirer 11A and the setting condition obtained by the second acquirer 11B.

To enable or disable the authenticated output function, an authenticated output function flag which is preset in the non-volatile storage 13 may be set or cleared, for example. To enable the authenticated output function, the authenticated output function flag is set. To disable the authenticated output function, the authenticated output function flag is cleared.

When the second acquirer 11B has acquired a condition for enabling the authenticated output function, the setter 11C enables the authenticated output function if the attribute information obtained by the first acquirer 11A satisfies the condition obtained by the second acquirer 11B.

If a user who requires authentication is in the room, the authenticated output function is enabled and the user is required to conduct authentication for outputting information, such as for outputting a medium with an image or displaying information.

If the attribute information obtained by the first acquirer 11A does not satisfy the condition obtained by the second acquirer 11B, the setter 11C disables the authenticated output function.

With this operation, when users requiring authentication have all left the room and only users who do not require authentication are in the room while the authenticated output function is enabled, the authenticated output function is disabled. Then, authentication is not required for outputting information, such as for outputting a medium with an image or displaying information.

When the second acquirer 11B has acquired a condition for disabling the authenticated output function, the setter 11C disables the authenticated output function if the attribute information obtained by the first acquirer 11A satisfies the condition obtained by the second acquirer 11B.

With this operation, when users who do not require authentication alone are in the room, the authenticated output function is disabled. Then, authentication is not required for outputting information, such as for outputting a medium with an image or displaying information.

If the attribute information obtained by the first acquirer 11A does not satisfy the condition obtained by the second acquirer 11B, the setter 11C enables the authenticated output function.

With this operation, when a user requiring authentication enters the room while the authenticated output function is disabled, the authenticated output function is enabled. Then, authentication becomes required for outputting information, such as for outputting a medium with an image or displaying information.

In the first exemplary embodiment, it is assumed that the authenticated output function is disabled in the initial state and the second acquirer 11B acquires a condition for enabling the authenticated output function. The first exemplary embodiment will be discussed through illustration of such an example.

When enabling the authenticated output function, if information is being output, such as a medium with an image is being output or information is being displayed while the authenticated output function is disabled, the setter 11C first stops outputting the medium or displaying the information before enabling the authenticated output function.

With this operation, even if a user who requires authentication enters the room while a medium with an image is being output or information is being displayed in the state in which the authenticated output function is disabled, outputting of the medium or displaying of the information can be stopped before the authenticated output function is enabled.
(Access Preventer)

When a medium with an image is being output or information is being displayed while the authenticated output function is disabled, the access preventer 11D sets a setting for preventing users from entering the room.

Information that the access preventer 11D has set this setting is sent to the detection device 40 via the network 80. Then, the detection device 40 stops the opening/closing controller 43 from opening the door so as to prevent users from entering the room.

The access preventer 11D may prevent a user from entering the room only when the user is found to be a user requiring authentication as a result of the card reader 41 reading the ID number when the user enters the room.

When outputting of a medium with an image or displaying of information while the authenticated output function is disabled has finished, the access preventer 11D cancels the setting for preventing users from entering the room.

With this operation, a user is able to enter the room when outputting of a medium with an image or displaying of information has finished.

[Information Processing Apparatus]

In the first exemplary embodiment, the information processing apparatus 20 includes an instructor 21A and the communication IF 27.

The CPU 21 of the information processing apparatus 20 executes the edit program 23A so as to function as the instructor 21A.
(Instructor)

The instructor 21A instructs the image forming device 10 to form an image or display information.

For example, after the information processing apparatus 20 has edited or created a document or a video image as a result of the CPU 21 executing the edit program 23A, the instructor 21A instructs the image forming device 10 to print this document or to display the image. When providing an instruction to print a document, for example, the instructor 21A sends an instruction to form an image, together with print data, to the image forming device 10 via the communication IF 27.

Upon receiving the print data from the information processing apparatus 20, the image forming device 10 causes the image forming unit 19 to form an image on a medium based on the print data. If image data is received from the information processing apparatus 20, the image forming device 10 displays the received image data on the display 15.
[Server]

In the first exemplary embodiment, the server 30 includes an instructor 31A, the communication IF 38, and the non-volatile storage 33.

The CPU 31 of the server 30 executes the data supply program 33C so as to function as the instructor 31A.
(Instructor)

In response to a request from the image forming device 10, the instructor 31A sends data in the attribute information database 33A and the user information database 33B stored in the non-volatile storage 33 to the image forming device 10 via the communication IF 38.

[Detection Device]

In the first exemplary embodiment, the detection device 40 includes a detector 41A, the communication IF 42, and the opening/closing controller 43.
(Detector)

By using the card reader 41, the detector 41A reads an ID number from an ID card provided to a user, and sends the read ID number to the server 30 via the communication IF 42. The detector 41A also determines whether the read ID number matches a registered ID number.
(Opening/Closing Controller)

Upon receiving information that a setting for preventing users from entering the room for a predetermined period has set from the image forming device 10, the opening/closing controller 43 stops opening the entrance door.

[Attribute Information Database]

The attribute information database 33A in the first exemplary embodiment will be explained below with reference to FIG. 3.

The attribute information database 33A is used when the second acquirer 11B acquires a setting condition for setting the authenticated output function. The attributes of users authorized to enter the room are stored in the attribute information database 33A.

More specifically, the attribute information database 33A has fields of a user attribute 33A1 and a setting 33A2. The content of the user attribute 33A1 and that of the setting 33A2 are stored in association with each other.
(User Attribute)

In the field of the user attribute 33A1, the attribute of a user authorized to enter the room is stored. Concerning the attributes of users, "outsider" is an outside user, "subcontractor" is a subcontractor user, "in-house employee (sales)" is an in-house employee in the sales department, and "in-house employee (development)" is an in-house employee in the development department.
(Setting)

In the field of the setting 33A2, a setting condition for the authenticated output function is stored. In association with the user attribute "outsider", "enable" is stored to indicate that the authenticated output function will be enabled. In association with the user attributes "contractor" and "in-house employee (sales)", "enable" is stored. In association with the user attribute "in-house employee (development)", "disable" is stored to indicate that the authenticated output function will be disabled.

The attribute information database 33A shows that, when at least one user among outsiders, contractors, and in-house employees in the sales department is in the room, the authenticated output function will be enabled and that, when in-house employees in the development department alone are in the room, the authenticated output function will be disabled.

An example of the use of the attribute information database 33A will be discussed.

To obtain a condition for enabling the authenticated output function, "outsider", "contractor", and "in-house employee (sales)" associated with "enable" in the setting 33A2 are obtained as the setting condition. Then, the user using the information processing apparatus 20 that has instructed the image forming device 10 to form an image is identified, and the company of the user is also found. If an outsider, a contractor, or an employee in the sales department of the company of the user is in the room, the authenticated output function is enabled.

In contrast, to obtain a condition for disabling the authenticated output function, "in-house employee (development)" associated with "disable" in the setting 33A2 is obtained as the setting condition. Then, the user using the information processing apparatus 20 that has instructed the image forming device 10 to form an image is identified, and the company of the user is also found. If employees in the development department of the company of the user alone are in the room, the authenticated output function is disabled.

[User Information Database]

The user information database 33B in the first exemplary embodiment will be explained below with reference to FIG. 4.

The user information database 33B is used when the first acquirer 11A acquires attribute information concerning users in the room. In the user information database 33B, the attributes concerning users in the room are stored.

More specifically, the user information database 33B has fields of a user name 33B1 and an attribute 33B2 in association with each other.

(User Name)

In the field of the user name 33B1, the names of users in the room are stored. In FIG. 4, "A" and "B" are stored as the names of users. In the field of the user name 33B1, the ID number may be stored instead of the user name.

(Attribute)

In the column of the attribute 33B2, the attribute of the user is stored in association with the user name. The user A is an in-house employee in the development department, and "in-house employee (development)" is stored in association with "A" in FIG. 4. The user B is an in-house employee in the sales department, and "in-house employee (sales)" is stored in association with "B" in FIG. 4.

To construct the user information database 33B, detection results obtained by the detector 41A of the detection device 40 may be used to update the user information database 33B whenever necessary.

Every time a user enters the room, the card reader 41 of the detection device 40 reads the ID number of this user, and the name and the attribute of this user are stored in the user information database 33B. Likewise, every time a user leaves the room, the card reader 41 reads the ID number of this user, and the name and the attribute of this user are deleted from the user information database 33B. In this manner, the user information database 33B is updated according to the necessity.

To construct the user information database 33B, schedule data indicating times at which individual users will enter and leave the room may alternatively be used.

In the first exemplary embodiment, the user information database 33B is updated by using the detection results obtained by the detector 41A of the detection device 40 by way of example.

(Operation)

An example of the operation of the image forming system 90 according to the first exemplary embodiment will be described below with reference to FIG. 5. The operation will be discussed by mainly referring to the image forming device 10. As an example of information to be output, a medium on which an image is formed is output by way of example.

Figure 5:
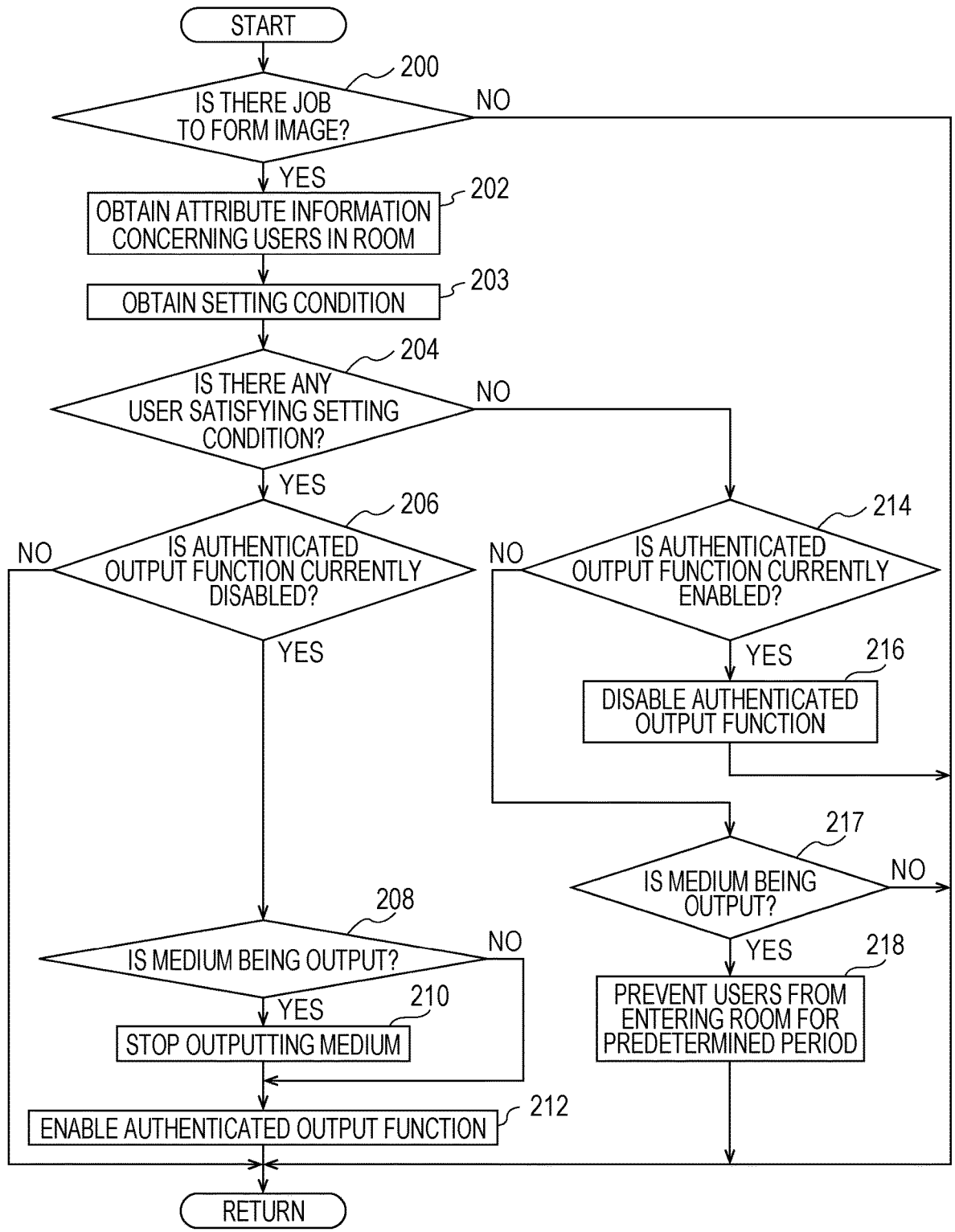
FIG. 5 is a flowchart illustrating an example of authenticated output setting processing according to the first exemplary embodiment.

As a result of the CPU 11 of the image forming device 10 executing the authenticated output setting program 13A, authenticated output setting processing shown in FIG. 5 is started. This processing is executed at regular intervals of a predetermined period (every minute, for example).

In step 200, the CPU 11 judges whether there is a job to form an image based on whether an instruction to perform printing has been received from one of the information processing apparatuses 20.

If the CPU 11 has judged that there is no job to form an image, it returns to the routine called this authenticated output setting processing. If the CPU 11 has judged that there is a job to form an image, it proceeds to step 202.

In step 202, the CPU 11 obtains attribute information concerning users in the room from the user information database 33B stored in the server 30.

More specifically, the CPU 11 obtains "in-house employee (development)" of the user name "A" and "in-house employee (sales)" of the user name "B" currently stored in the user information database 33B shown in FIG. 4 as the attribute information. The CPU 11 determines whether "A" and "B" are employees of the company of the user using the information processing apparatus 20 that has provided an instruction to form an image.

In step 203, the CPU 11 obtains the user attribute 33A1 and the setting 33A2 from the attribute information database 33A stored in the server 30 shown in FIG. 3 as the setting condition.

As the setting condition, a condition for enabling the authenticated output function of the image forming device 10 or a condition for disabling the authenticated output function may be set. In the first exemplary embodiment, a condition for enabling the authenticated output function of the image forming device 10 is acquired.

That is, in the first exemplary embodiment, the user attributes associated with "enable" in the setting 33A2 are obtained. More specifically, the attributes "outsider", "contractor", and "in-house employee (sales)" are obtained.

In step 204, the CPU 11 judges from the attribute information obtained in step 202 whether there is a user whose attribute satisfies the setting condition obtained in step 203 in the room.

If the CPU 11 has judged in step 204 that there is such a user in the room, it proceeds to step 206. If the CPU 11 has judged in step 204 that such a user is not in the room, it proceeds to step 214.

It is now assumed that the attribute information obtained in step 202 indicates that the names of users currently in the room are "A" and "B" and the attribute of the user name "A"

is "in-house employee (development)" and that of the user name "B" is "in-house employee (sales)", as shown in FIG. 4. The condition for enabling the authenticated output function obtained in step 203 is "outsider", "contractor", and "in-house employee (sales)" as shown in FIG. 3, and the user name "B" having the attribute "in-house employee (sales)", which is part of the condition for enabling the authenticated output function, is in the room.

The CPU 11 thus judges in step 204 that there is a user whose attribute satisfies the setting condition in the room and proceeds to step 206.

In step 206, the CPU 11 judges whether the authenticated output function is currently disabled. If the authenticated output function is currently disabled, the CPU 11 proceeds to step 208. If the authenticated output function is currently enabled, the CPU 11 returns to the routine called this authenticated output setting processing.

In the first exemplary embodiment, the authenticated output function is disabled in the initial state, and the authenticated output function flag is cleared. The CPU 11 thus proceeds to step 208.

In step 208, the CPU 11 judges whether a medium on which an image is formed is being output.

If a medium is being output, the CPU 11 proceeds to step 210. If a medium is not being output, the CPU 11 proceeds to step 212.

In step 210, the CPU 11 clears an output flag set in the non-volatile storage 13, for example, so as to stop outputting a medium. The CPU 11 also outputs a signal for stopping forming and outputting an image to the image forming unit 19. In this manner, the CPU 11 stops forming an image on a medium and also outputting a medium.

In step 212, the CPU 11 sets the authenticated output function flag to enable the authenticated output function, and then returns to the routine called this authenticated output setting processing.

A description will now be given of a case in which the user name "B" leaves the room and there is no user whose attribute satisfies the setting condition obtained in step 203 in the room.

In this case, the CPU 11 judges in step 204 that there is no user whose attribute satisfies the setting condition in the room, and proceeds to step 214.

In step 214, the CPU 11 judges whether the authenticated output function is currently enabled. If the authenticated output function is currently enabled, the CPU 11 clears the authenticated output function flag to disable the authenticated output function in step 216 and then returns to the routine called this authenticated output setting processing.

If the CPU has judged in step 214 that the authenticated output function is currently disabled, it judges in step 217 whether a medium with an image is being output. If a medium with an image is being output, the CPU 11 proceeds to step 218. If a medium with an image is not being output, the CPU 11 returns to the routine called this authenticated output setting processing.

In step 218, the CPU 11 sets a setting for preventing users from entering the room for a predetermined period. More specifically, the CPU 11 sets an access prohibit flag stored in the non-volatile storage 13, for example, so as to prevent users from entering the room, and also sends information that users are not allowed to enter the room for a predetermined period to the detection device 40 via the network 80.

Upon receiving this information, the opening/closing controller 43 of the detection device 40 stops opening the entrance door for the predetermined period, thereby preventing users from entering the room. After the lapse of the predetermined period, the detection device 40 restarts the opening/closing controller 43 to open the entrance door, thereby letting users enter the room.

The above-described predetermined period is a time taken to finish outputting a medium with an image. That is, when the outputting of a medium has finished, users are able to enter the room.

As described above, in the first exemplary embodiment, the authenticated output function is suitably enabled or disabled.

The second acquirer 11B may acquire a condition for enabling the authenticated output function as the setting condition. The setter 11C may enable the authenticated output function when the attribute information acquired by the first acquirer 11A satisfies the condition acquired by the second acquirer 11B.

The setter 11C may disable the authenticated output function when the attribute information acquired by the first acquirer 11A does not satisfy the condition acquired by the second acquirer 11B.

The second acquirer 11B may acquire a condition for disabling the authenticated output function as the setting condition. The setter 11C may disable the authenticated output function when the attribute information acquired by the first acquirer 11A satisfies the condition acquired by the second acquirer 11B.

The setter 11C may enable the authenticated output function when the attribute information acquired by the first acquirer 11A does not satisfy the condition acquired by the second acquirer 11B.

The first acquirer 11A may acquire the attribute information by using a detection result obtained by the detector 41A of the detection device 40. The detector 41A detects user access to the room.

The first acquirer 11A may acquire the attribute information by using schedule information indicating a schedule of access to the room.

When enabling the authenticated output function, if a medium with an image is being output while the authenticated output function is disabled, the setter 11C may stop outputting the medium before enabling the authenticated output function.

The image forming device 10 may further include the access preventer 11D that prevents a user from accessing the room if a medium with an image is being output while the authenticated output function is disabled.

The access preventer 11D may stop preventing a user from accessing the room when outputting of the medium while the authenticated output function is disabled has finished.

Second Exemplary Embodiment

A second exemplary embodiment of the disclosure will now be described below with reference to FIGS. 6 through 8. Elements identical to or similar to those of the first exemplary embodiment are designated by like reference numerals, and an explanation thereof will be omitted. The second exemplary embodiment will be discussed by mainly referring to portions different from the first exemplary embodiment.

Figure 6:
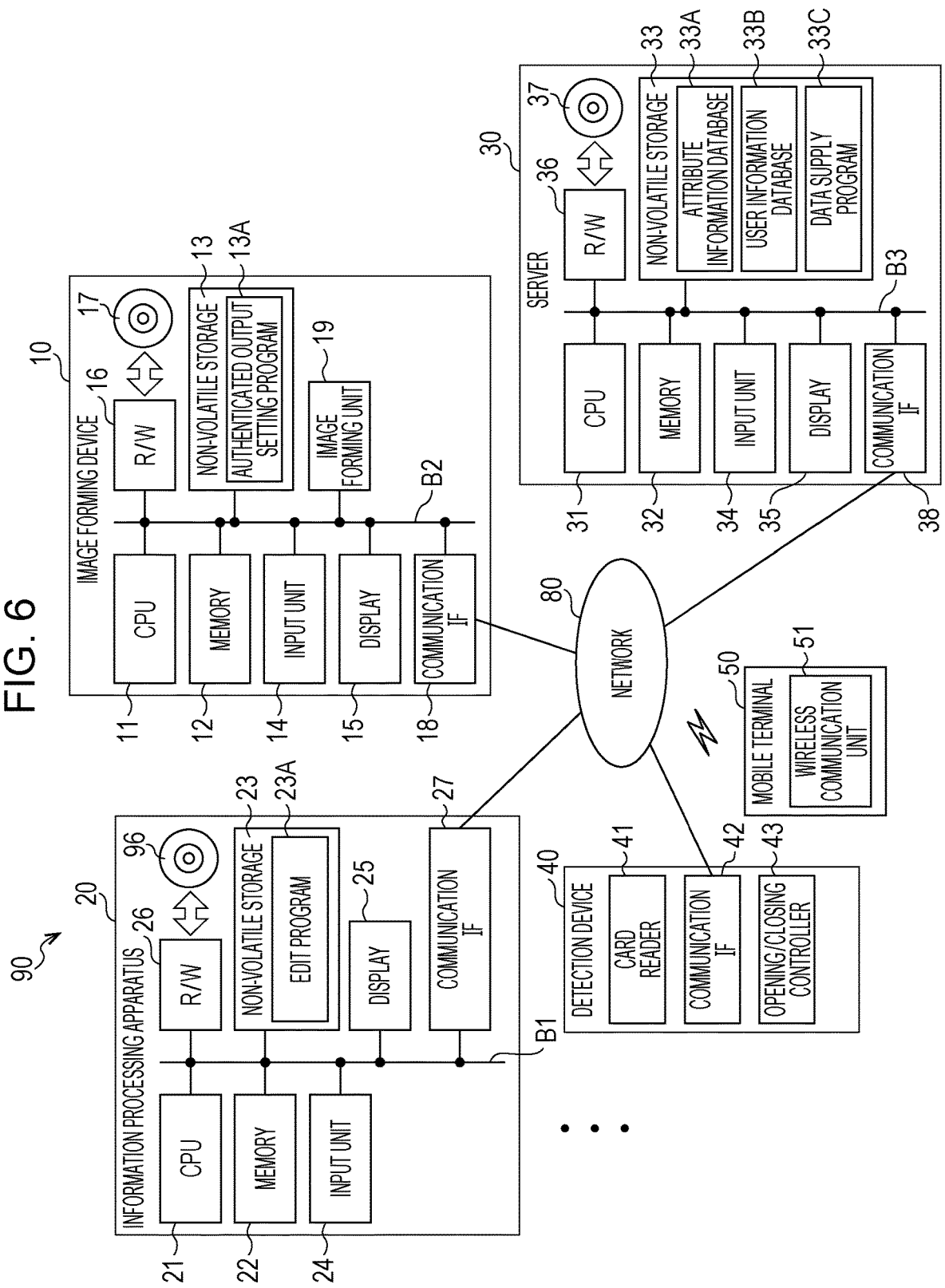
FIG. 6 is a block diagram illustrating an example of the hardware configuration of an image forming system according to a second exemplary embodiment.
Figure 7:
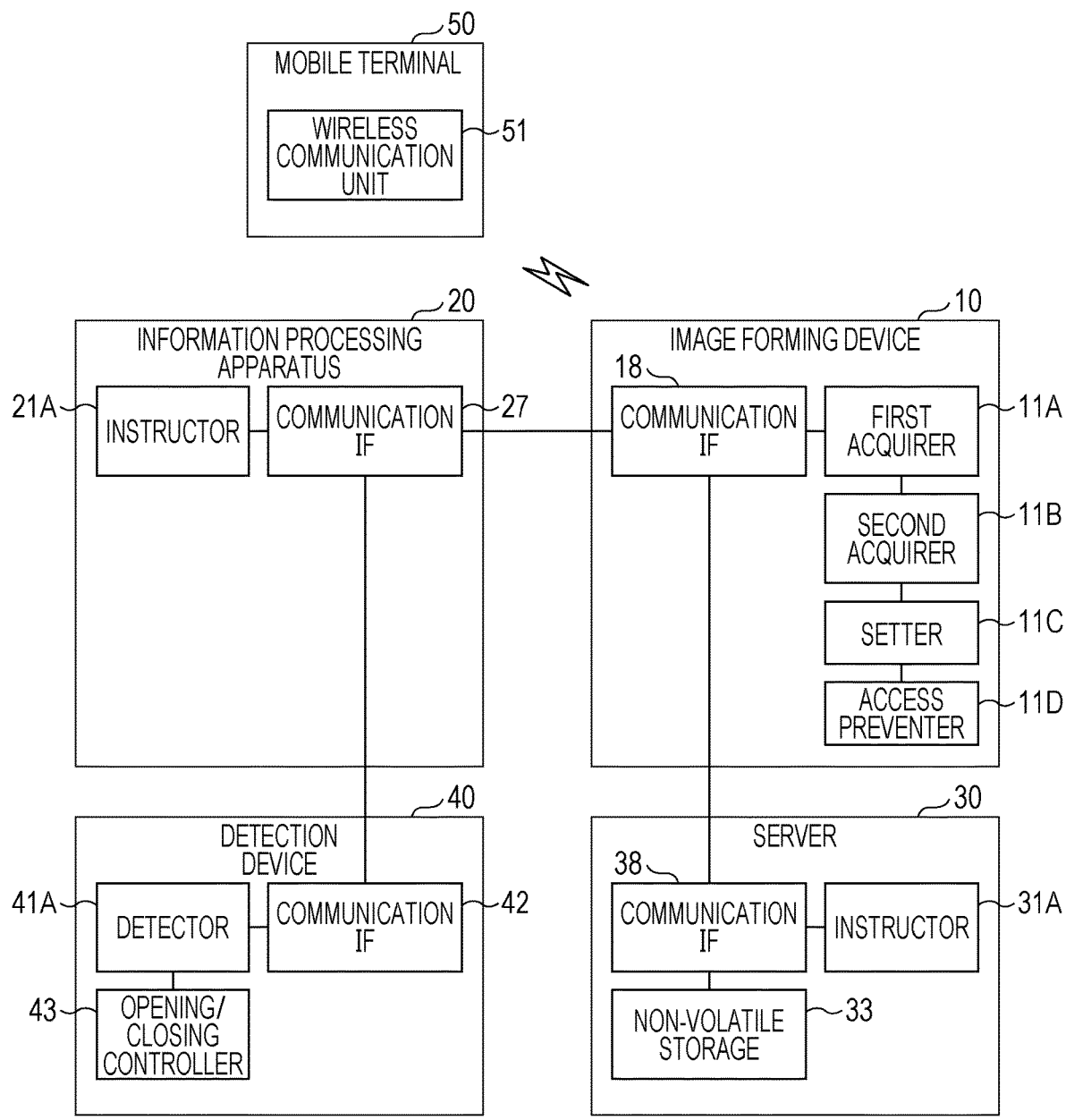
FIG. 7 is a block diagram illustrating an example of the functional configuration of the image forming system according to the second exemplary embodiment.

As shown in FIG. 6, an image forming system 90 according to the second exemplary embodiment includes an image forming device 10, plural information processing apparatuses 20, a server 30, and a detection device 40. These elements are connected to a network 80 so that they can communicate with each other. The image forming system 90 also includes a mobile terminal 50 which communicates with the image forming device 10 by using radio waves.
(Mobile Terminal)

The mobile terminal 50 is a terminal owned by a user authorized to enter the room. An example of the mobile terminal 50 is a smartphone. Other users authorized to enter the room also have mobile terminals 50 configured similar to the above-described mobile terminal 50.

Unique numbers are appended to the mobile terminals 50 owned by the users and are stored in the non-volatile storage 33 of the server 30 in advance, for example. Communication data received from each mobile terminal 50 is appended with a corresponding unique number, and by this unique number, the image forming device 10 is able to recognize the mobile terminal 50 and to identify the user of this mobile terminal 50.

The mobile terminal 50 includes a wireless communication unit 51. The wireless communication unit 51 is able to communicate with the communication IF 18 of the image forming device 10 by using radio waves, namely, within a range where radio waves can reach. This range is several meters, for example.

The functional configurations of the mobile terminal 50 and the image forming device 10 according to the second exemplary embodiment will be described below with reference to FIG. 7.
[Mobile Terminal]

The mobile terminal 50 includes the wireless communication unit 51.
(Wireless Communication Unit)

The wireless communication unit 51 has a function of constantly searching for devices with which the mobile terminal 50 can communicate. An example of such a device is the image forming device 10.

Upon detecting the image forming device 10 within a range where radio waves can reach, the wireless communication unit 51 sends communication data appended with the unique number of the mobile terminal 50 to the image forming device 10 so as to start communicating with the image forming device 10. If communication with the image forming device 10 is disconnected due to the decreased strength of radio waves received from the image forming device 10, the wireless communication unit 51 terminates communication with the image forming device 10.
[Image Forming Device]
(Communication IF)

The communication IF 18 of the image forming device 10 has a function of communicating with the wireless communication unit 51 of the mobile terminal 50 by using radio waves.
(Setter)

After enabling the authenticated output function, if the distance between the image forming device 10 and a user having attribute information for which the authenticated output function will be enabled is a predetermined distance or greater, the setter 11C of the image forming device 10 disables the authenticated output function.

The setter 11C finds a distance with such a user by using the strength of radio waves received from the mobile terminal 50 by the communication IF 18, which serves as a communication unit.

For example, when communication between the communication IF 18 and the mobile terminal 50 is disconnected, the setter 11C judges that the distance between the image forming device 10 and the user is the predetermined distance or greater.

(Operation)

An example of the operation of the image forming system 90 according to the second exemplary embodiment will be described below with reference to FIG. 8. The operation will be discussed by mainly referring to the image forming device 10.

Figure 8:
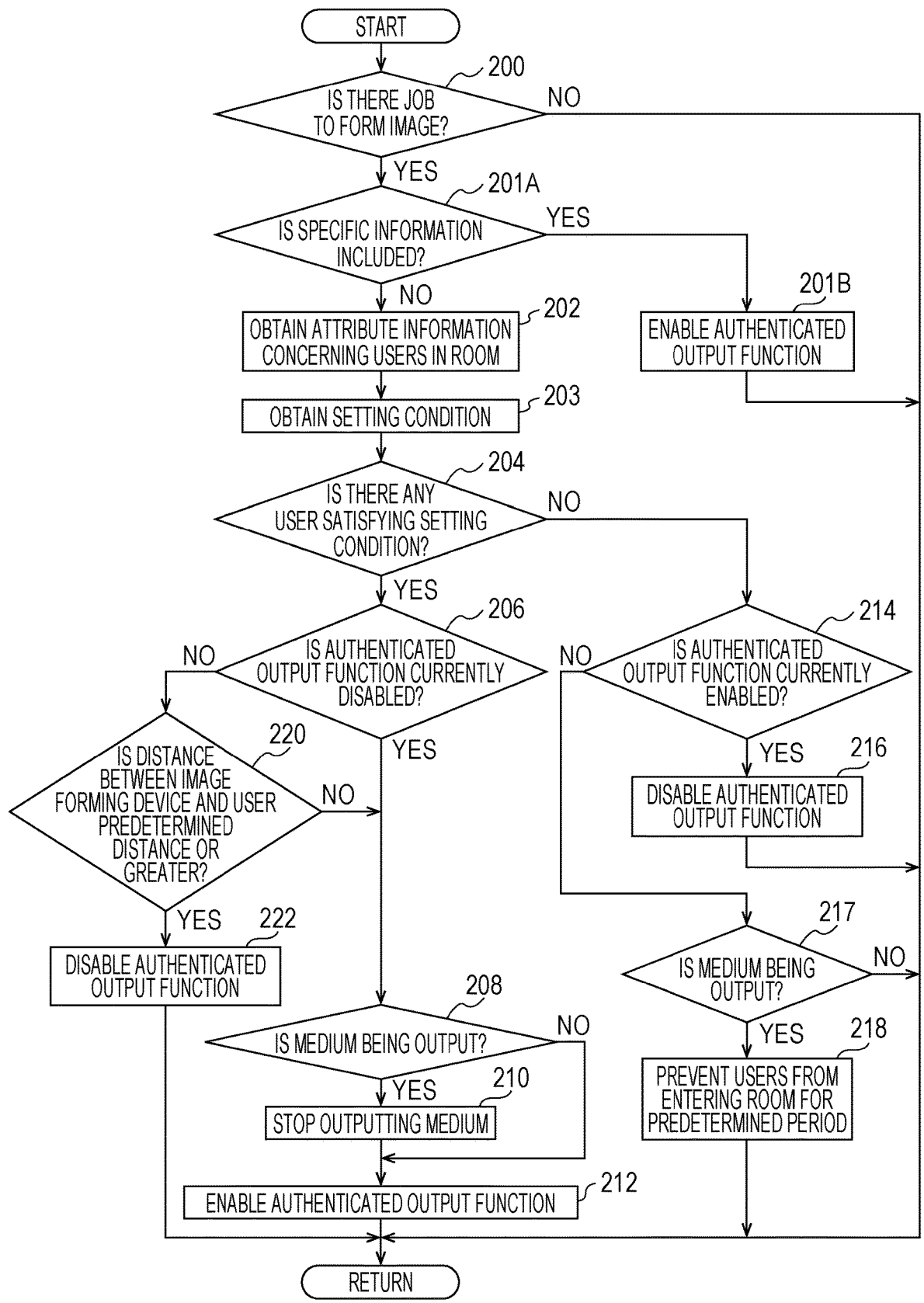
FIG. 8 is a flowchart illustrating an example of authenticated output setting processing according to the second exemplary embodiment.

As a result of the CPU 11 of the image forming device 10 executing the authenticated output setting program 13A, authenticated output setting processing shown in FIG. 8 is started. This processing is executed at regular intervals of a predetermined period (every minute, for example).

If the CPU 11 has determined in step 200 that there is a job to form an image since an instruction to perform printing has been received from one of the information processing apparatuses 20, it judges in step 201A whether specific information is included in print data. If specific information is included in the print data, the CPU 11 proceeds to step 201B. If specific information is not included in the print data, the CPU 11 proceeds to step 202.

An example of specific information is confidential information. Judgement as to whether confidential information is included in print data is made according to whether a specific word or mark is included in a document of print data. Examples of the specific word or mark are characters "internal use only" or an internal-use-only mark. Judgement as to whether confidential information is included in print data may be made according to the file name appended to print data.

If the CPU 11 has judged in step 201A that specific information is included in the print data, it enables the authenticated output function and then returns to the routine called this authenticated output setting processing. With this operation, even with only conditions for disabling the authenticated output function, the authenticated output function is unconditionally enabled when print data including specific information is printed.

In step 202, the CPU 11 obtains attribute information concerning users in the room from the user information database 33B stored in the server 30. In step 203, the CPU 11 obtains a condition for enabling the authenticated output function. In step 204, the CPU 11 judges from the attribute information obtained in step 202 whether there is a user whose attribute satisfies the setting condition obtained in step 203 in the room. If such a user is in the room, the CPU 11 judges in step 206 whether the authenticated output function is currently disabled. If the authenticated output function is currently enabled, the CPU 11 judges in step 220 whether the distance between the image forming device 10 and the user having attribute information for which the authenticated output function will be enabled is a predetermined distance or greater.

If the CPU 11 has judged in step 220 that the distance between the image forming device 10 and the user is less than the predetermined distance, it judges in step 208 whether a medium is being output. If it is found in step 220 that the distance between the image forming device 10 and the user is the predetermined distance or greater, the CPU 11 disables the authenticated output function in step 222.

More specifically, the CPU 11 judges in step 220 whether the distance between the image forming device 10 and the user is the predetermined distance or greater by using the strength of radio waves received from the mobile terminal 50 of the user by the communication IF 18.

That is, if the mobile terminal 50 of the user and the communication IF 18 are able to communicate with each other by using radio waves, the CPU 11 determines in step 220 that the distance between the image forming device 10 and the user is less than the predetermined distance. The CPU 11 then executes steps 208 through 212 to enable the authenticated output function.

If the mobile terminal 50 of the user and the communication IF 18 are unable to communicate with each other by using radio waves, the CPU 11 determines in step 220 that the distance between the image forming device 10 and the user is the predetermined distance or greater. The CPU 11 then disables the authenticated output function in step 222 and then returns to the routine called this authenticated output setting processing. Forming of an image on a medium and outputting of a medium with an image is enabled.

As an example of such a situation, the mobile terminal 50 of a user requiring authentication is communicating with the communication IF 18, and then, the user separates from the image forming device 10 so that communication is disconnected.

In the second exemplary embodiment, after the setter 11C has enabled the authenticated output function, if a distance between the image forming device 10 and a user having attribute information for which the authenticated output function will be enabled is a predetermined distance or greater, the setter 11C may disable the authenticated output function.

The communication IF 18 communicates with the mobile terminal 50 by using radio waves. The setter 11C may find the distance between the image forming device 10 and the user by using the strength of radio waves received from the mobile terminal 50 by the communication IF 18.

The setter 11C may determine that the distance between the image forming device 10 and the user is the predetermined distance or greater when communication between the communication IF 18 and the mobile terminal 50 is disconnected.

In the first and second exemplary embodiments, as the hardware structure of the processing unit which executes processing of each of the components, the following various processors may be used.

In addition to the above-described CPU, which is a general-purpose processor functioning as the processing unit as a result of executing software (software program), a programmable logic device (PLD), such as a field-programmable gate array (FPGA), designed to be configured by a customer or a designer after manufacturing, and dedicated electric circuitry, such as an application specific integrated circuit (ASIC), having a dedicated circuit configuration customized for a particular use may be used.

The processing unit may be constituted by one of the above-described various processors, or by a combination of two or more processors of the same type or different types (such as a combination of plural FPGAs or a combination of a CPU and an FPGA). The processing unit may be configured by a single processor.

As an example in which the processing unit is configured by a single processor, the following two modes are available. One mode is typically found in a computer in a client-server system. A processor is constituted by one or more CPUs and software and functions as the processing unit. The other mode is typically found in a system-on-a-chip (SoC). A processor is implemented by one integrated circuit (IC) chip integrating all the system functions including the processing unit. In this manner, the hardware structure of the processing unit is constituted by at least one of the above-described various processors.

As an example of the hardware structure of various processors, electric circuitry as a combination of circuit elements, such as semiconductor elements, may be used.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information output device comprising:
a processor programmed to:
acquire attribute information concerning an attribute of users in an area where access control is performed;
acquire a setting condition for setting an authenticated output function, the authenticated output function being a function for demanding authentication for outputting information; and
determine from the acquired attribute information whether the attribute of any of the users in the area satisfies the setting condition, and determine whether the authenticated output function is disabled or enabled;
if the processor determines that the attribute of a user in the area satisfies the condition and determines that the authenticated output function is disabled, enable the authenticated output function; and
if the processor determines that no user in the area satisfies the setting condition and determines that the authenticated output function is enabled, disable the authenticated output function.

2. The information output device according to claim 1, the processor is further programmed to:
acquire a condition for enabling the authenticated output function as the setting condition; and
enable the authenticated output function when the acquired attribute information satisfies the acquired condition for enabling the authenticated output function.

3. The information output device according to claim 2, wherein the processor is further programed to:
disable the authenticated output function when the acquired attribute information does not satisfy the acquired condition for enabling the authenticated output function.

4. The information output device according to claim 1, wherein the processor is further programmed to:
acquire a condition for disabling the authenticated output function as the setting condition; and
disable the authenticated output function when the acquired attribute information satisfies the acquired condition for disabling the authenticated output function.

5. The information output device according to claim 4, wherein the processor is further programmed to enable the authenticated output function when the acquired attribute information does not satisfy the condition for disabling the authenticated output function.

6. The information output device according to claim 1, wherein the processor is further programmed to acquire the attribute information by using a detection result obtained by a detector of a detection device, the detector detecting user access to the area.

7. The information output device according to claim 1, wherein the processor is further programmed to acquire the attribute information by using schedule information indicating a schedule of access to the area.

8. The information output device according to claim 1, wherein, when enabling the authenticated output function, if information is being output while the authenticated output function is disabled, the processor is further programmed to stop outputting the information before enabling the authenticated output function.

9. The information output device according to claim 1, wherein the processor is further programmed to:
prevent a user from accessing the area if information is being output while the authenticated output function is disabled.

10. The information output device according to claim 9, wherein the processor is further programmed to:
stop preventing a user from accessing the area when outputting of the information while the authenticated output function is disabled has finished.

11. The information output device according to claim 1, wherein, after the authenticated output function has been enabled, if a distance between the information output device and a user having attribute information for which the authenticated output function will be enabled is a predetermined distance or greater, the processor is further programmed to disable the authenticated output function.

12. The information output device according to claim 11, further comprising:
a communication interface that communicates with a terminal of the user by using radio waves,
wherein the processor is further configured to find the distance between the information output device and the user by using strength of radio waves received from the terminal by the communication interface.

13. The information output device according to claim 12, wherein the processor is further programmed to determine that the distance between the information output device and the user is the predetermined distance or greater when communication between the communication interface and the terminal is disconnected.

14. A non-transitory computer readable medium storing a program causing a computer to execute a process, the process comprising:
acquiring attribute information concerning an attribute of a user having accessed an area where access control is performed;
acquiring a setting condition for setting an authenticated output function, the authenticated output function being a function for demanding authentication for outputting information; and
determining from the acquired attribute information whether the attribute of any of the users in the area satisfies the setting condition, and determining whether the authenticated output function is disabled or enabled;
if a determination is made that the attribute of a user in the area satisfies the condition and that the authenticated output function is disabled, enabling the authenticated output function; and
if a determination is made that no user in the area satisfies the setting condition and that the authenticated output function is enabled, disabling the authenticated output function.

15. An information output system comprising:
an information output device including a processor programmed to:
acquire attribute information concerning an attribute of a user having accessed an area where access control is performed,
acquire a setting condition for setting an authenticated output function, the authenticated output function being a function for demanding authentication for outputting information, and
determine from the acquired attribute information whether the attribute of any of the users in the area satisfies the setting condition, and determine whether the authenticated output function is disabled or enabled;
if the processor determines that the attribute of a user in the area satisfies the condition and determines that the authenticated output function is disabled, enable the authenticated output function; and
if the processor determines that no user in the area satisfies the setting condition and determines that the authenticated output function is enabled, disable the authenticated output function; and
an information processing apparatus including an instructor that instructs the information output device to output information.

16. The information output system according to claim 15, further comprising:
a detection device including a detector that detects user access to the area,
wherein the processor is further programmed to acquire the attribute information by using a detection result obtained by the detector.

17. The information output system according to claim 15, further comprising:
a server in which schedule information concerning a schedule of access to the area is stored,
wherein the processor is further programmed to acquire the attribute information by using the schedule information.

18. The information output system according to claim 15, wherein the processor is further programmed to:
prevent a user from accessing the area if information is being output while the authenticated output function is disabled.

19. The information output system according to claim 18, wherein the processor is further programmed to stop preventing a user from accessing the area when outputting of the information while the authenticated output function is disabled has finished.

* * * * *